US011521264B2

(12) United States Patent
Poilil et al.

(10) Patent No.: US 11,521,264 B2
(45) Date of Patent: Dec. 6, 2022

(54) VISUALIZING INTEREST CHARGES BASED ON PAYMENT OPTIONS

(71) Applicant: Capital One Services, LLC, McLean, VA (US)

(72) Inventors: Afna Kanhirothan Poilil, Schaumburg, IL (US); Eric K. Barnum, Midlothian, VA (US); Seshu Pitcha, Schaumburg, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/874,156

(22) Filed: May 14, 2020

(65) Prior Publication Data

US 2021/0358027 A1   Nov. 18, 2021

(51) Int. Cl.
| | | |
|---|---|---|
| *G06Q 40/02* | (2012.01) | |
| *G06Q 10/10* | (2012.01) | |
| *G06Q 20/40* | (2012.01) | |
| *G06Q 20/22* | (2012.01) | |
| *G06Q 10/04* | (2012.01) | |
| *G06N 20/00* | (2019.01) | |
| *G06N 5/04* | (2006.01) | |
| *G06F 3/04847* | (2022.01) | |

(52) U.S. Cl.
CPC .............. *G06Q 40/02* (2013.01); *G06N 5/04* (2013.01); *G06N 20/00* (2019.01); *G06Q 10/04* (2013.01); *G06Q 10/109* (2013.01); *G06Q 20/227* (2013.01); *G06Q 20/40* (2013.01); *G06F 3/04847* (2013.01)

(58) Field of Classification Search
CPC .... G06Q 40/02; G06Q 20/227; G06Q 10/109; G06Q 20/40; G06Q 10/04; G06N 5/04; G06N 20/00; G06F 3/04847
USPC .......................................................... 705/40
See application file for complete search history.

(56) References Cited

U.S. PATENT DOCUMENTS

| | | | |
|---|---|---|---|
| 6,353,811 B1 * | 3/2002 | Weissman ............... | G06Q 20/04 705/40 |
| 8,626,632 B1 * | 1/2014 | Dolan .................... | G06Q 40/04 705/36 R |
| 2015/0032613 A1 * | 1/2015 | DiGiulio .............. | G06Q 20/102 705/40 |

OTHER PUBLICATIONS

Google Scholar NPL (non-patent literature) Search Feb. 18, 2022. (Year: 2022).*

* cited by examiner

*Primary Examiner* — Hai Tran
(74) *Attorney, Agent, or Firm* — Banner & Witcoff, Ltd.

(57) ABSTRACT

Systems as described herein may visualization interest charges based on payment options. Transaction information associated with a plurality of recurring payment accounts may be received. A calendar view displaying an aggregated daily balance and an aggregated interest charge may be generated. Upon receiving a transaction request with a transaction amount, a projected aggregated daily interest charge may be generated in real-time. After detecting that the projected aggregated daily interest charge exceeds a threshold amount, an alert associated with the calendar view may be generated to recommend an alternative payment method to a user device.

21 Claims, 8 Drawing Sheets

FIG. 6B

LET US HELP YOU SAVE MORE

START BY SELECTING THE AMOUNT YOU WISH TO PAY

○ INTEREST  ○ BALANCE AMOUNT

PAYMENT AMOUNT $344

| REGULAR PURCHASE | $8.74 |
| STATEMENT FEES | $0 |
| RETAIL PURCHASE | $0 |

| SU | MO | | | | | SA |
|---|---|---|---|---|---|---|
| 1 | 2 | 3 $8.74 $400.41 | 4 $8.80 $400.68 | 5 $9.24 $400.94 | 6 $9.48 $409.18 | 7 $9.72 $409.42 |
| 8 $9.87 $409.57 | 9 $10.21 409.91 | 10 $10.48 $450.96 | 11 $10.70 $410.40 | 12 $10.04 $410.64 | 13 $11.18 $410.62 | 14 $11.43 $411.13 |
| 15 $11.67 $415.33 | 16 $11.91 $411.62 | 17 $12.16 $411.66 | 18 $12.40 $412.30 | 19 $12.65 $412.35 | 20 $12.89 $412.59 | 19 $13.13 $412.63 |
| 22 $13.33 $413.08 | 23 $13.62 $413.02 | 24 $13.85 $413.06 | 25 $14.10 $413.60 | 26 $14.34 $414.04 | 27 $14.58 $414.18 | 28 $13.13 $412.63 |
| 29 $18.01 $419.67 | 30 $18.01 $419.67 | 31 $18.01 $419.67 | | | | |

FIG. 6C

VISUALIZING INTEREST CHARGES BASED ON PAYMENT OPTIONS

FIELD OF USE

Aspects of the disclosure relate generally to big data and more specifically to the processing and management of transaction data.

BACKGROUND

In an electronic payment processing network, a financial institution may receive transaction information corresponding to a variety of recurring payment accounts from a consumer, such as a credit card account, a car loan, a mortgage, or a home equity line of credit account. The financial institution may provide a statement for an account balance and interest charges in a billing cycle. The financial institutions may notify their customers of the interest charges after they have accrued. However, customers in the conventional systems may lack insights into the projected interest charges before making a purchase or a payment, thereby limiting their ability to view their financial obligations in real-time and make informed decisions to minimize interest payments.

Aspects described herein may address these and other problems, and generally improve the quality, efficiency, and speed of processing transaction data to offer insights into the details of the financial obligations in real-time by visualizing interest charges based on payment options.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for visualizing interest charges based on payment options. An electronic payment system may receive transaction information associated with numerous recurring payment accounts for a user and the transaction information may include a balance amount, an interest rate, and a billing cycle associated with each of the recurring payment account. A calendar view may be generated for the recurring payment accounts, where the calendar view may display an aggregated daily balance and an aggregated daily interest charge in the billing cycle. The electronic payment system may receive a request to authorize a transaction originated from a specific recurring payment account, and determine a projected interest charge for the transaction and a projected aggregated daily interest charge for the recurring payment accounts. Upon detecting that the projected aggregated daily interest charge exceeds a threshold amount, an alert associated with the calendar view may be generated to recommend an alternative payment method to a user device, such as using a cash payment, a debit card, or a checking account.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 6A-C show various example calendar views based on payment options according to one or more aspects of the disclosure.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for visualizing interest charges based on payment options. The electronic payment system may generate a calendar view that displays a daily balance and a daily interest charge for each of the recurring payment accounts. In response to a projected payment amount provided by a user to be allocated to a specific recurring payment account, the electronic payment system may dynamically generate a projected calendar view in real-time with a projected daily balance and a projected daily interest charge for the specific recurring payment account. The electronic payment system may also dynamically generate the projected calendar view in real-time with an aggregated projected daily balance and an aggregated projected daily interest charge for a plurality of recurring payment accounts.

The interest visualization system as described herein allow for detecting a payment pattern for a user, such as amounts and frequencies of payments for the plurality of recurring payment accounts. Based on the payment pattern, the system may determine an optimal payment schedule to minimize an aggregated interest payment amount on the plurality of recurring payment accounts.

In many aspects, prior to authorizing a transaction on a specific recurring payment account, the system may detect that a projected daily interest exceeds a threshold amount associated with a plurality of recurring payment accounts for a user and generate an alert. The threshold amount may correspond to a daily interest charge from the plurality of recurring payment accounts associated with a calendar date in a current billing cycle or an accumulated interest charge from the plurality of recurring payment accounts since a last billing cycle.

Interest Visualization Systems

Figure 1:
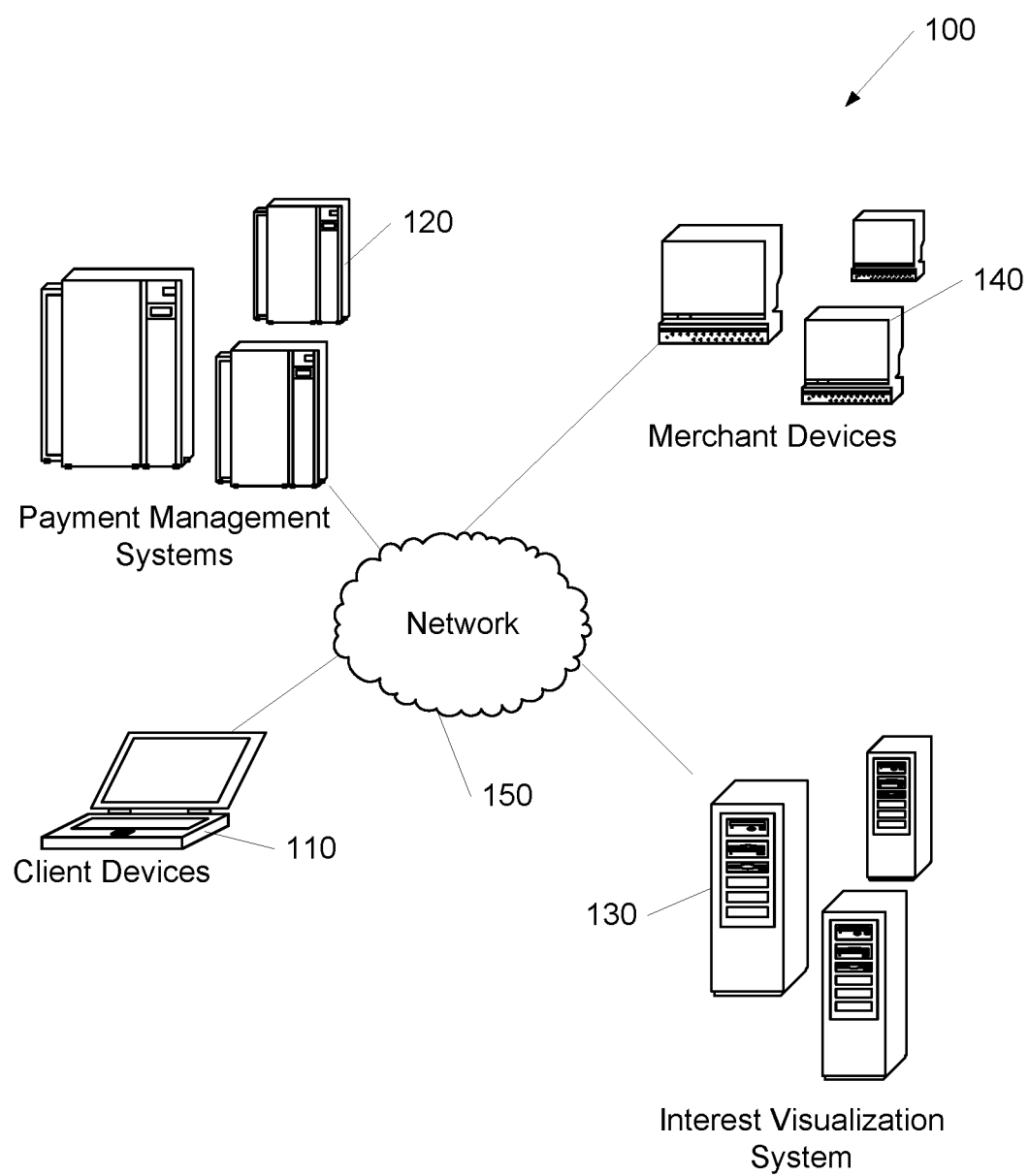
FIG. 1 shows an example of a system for visualizing interest charges based on payment options in which one or more aspects described herein may be implemented.

FIG. 1 shows an interest visualization system 100. The visualization system 100 may include one client device 110, at least one payment management system 120, at least one interest visualization system 130, and/or at least one merchant device 140 in communication via a network 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may request payment information such as account balance and interest charges, submit payment information, set up a threshold amount for interest charges, and/or obtain payment data corresponding to a user's recurring payment accounts. Payment management system 120 may receive, process, store and send payment data for the recurring payment accounts. The payment data may include transaction information such as an account balance, an interest rate, and a billing cycle associated with each of the plurality of recurring payment accounts.

Interest visualization system 130 may receive requests from client devices 110 to display payment information. Interest visualization system 130 may send the requests to payment management system 120, retrieve the payment data from payment management system 120 and generate a calendar view to be displayed to client devices 110. In the calendar view, for each date in a billing cycle, real-time payment information on a recurring payment account, such as a daily balance and a daily interest charge may be displayed. The calendar view may also display real-time payment information on a plurality of recurring payment accounts for a user, such as an aggregated daily balance and an aggregated daily interest charge. Interest visualization system 130 may receive a projected payment amount entered by a user from client devices 110. Based on the projected payment amount, interest visualization system 130 may dynamically generate a calendar view in real-time to display a projected daily balance and a projected daily interest charge for one or more recurring payment accounts. As the user changes the projected payment amount via client devices 110, the calendar view may be dynamically updated to display the corresponding projected daily balance and projected interest charges. Upon receiving a confirmation from a user on a payment amount, interest visualization system 130 may send the payment amount to payment management system 120 for further processing.

Interest visualization system 130 may receive inputs from a user via user devices 110 to set up a threshold amount for interest charges for one or more of the recurring payment accounts. To manage the overall financial obligations, the user may set up a threshold amount and stipulate that the user's interest charges would not go beyond the threshold amount. The threshold amount may be a daily interest charge for a specific recurring payment account—for example, the user may stipulate a threshold amount of a daily maximum $20 for the interest charge on a credit card account. The threshold amount may be an aggregated daily interest charge for a plurality of recurring payment accounts—for example, the user may stipulate a daily threshold of $50 for interest charges on all the recurring payment accounts in aggregation. The threshold amount may be an accumulated interest charge in a billing cycle for a plurality of recurring payment accounts—for example, the user may stipulate a threshold of $100 for all the recurring payment accounts in aggregation for a billing cycle. The threshold amount may also be on a subset of the users recurring payment accounts, which may include one or more of the credit card accounts, a car loan account, a mortgage account, or a home line of credit account etc. The threshold amount may be related to one or more of these recurring payment accounts for any arbitrary period of time, such as daily, weekly, monthly or per billing cycle, quarterly, and annually.

For example, a user may have a first recurrent payment account with a balance of $1000 and a monthly interest charge of $12, and a second recurrent payment account with a balance of $10,000 and a monthly interest charge of $120. In a variety of embodiments, the threshold amount may be a summation of interests from the plurality of recurring payment accounts, such as $132 based on a summation from the first and the second recurring payment account.

In a variety of embodiments, the threshold amount may be set by the user base on the user's own personal sense of her financial health with an eye to how fast the user may prefer to get out of debt. For example, the user may stipulate that the user would not be willing to pay more than an aggregated monthly interest of $100 on the plurality of recurring payment accounts. Alternatively, based on a summation of $132, the user may stipulate, "how do I reduce my interest by $32 per month?" In both situations, the user may set the threshold amount to be 100.

In a variety of embodiments, the threshold amount may be set by a machine learning system using a set of training data. The training data may be based on historical data such as a user's account payment profile, payment types, the user's transaction pattern, the amount of credit available to the user, the APRs on user accounts, and payment cycle. The user's payment profile may include the frequencies and sizes of the user payment, where most users may tend to make big payment per billing cycle, while other users may make several small payments in a billing cycle. The training data may also include various projected payment amounts provided by the user via the calendar view. For example, the machine learning system may set an initial threshold amount, which may trigger alerts, generate guidance for making alternative payment. As user may take corrective actions in response to the alerts, the interest payment may be increased or reduced accordingly. The machine learning system may determine whether to adjust the initial threshold amount to accelerate, de-accelerate or preserve the initial threshold amount. After going through several iterations of training process, the machine learning systems may generate an optimal threshold amount for the plurality of recurring payment accounts as an output. The optimal threshold may have the potential to reduce aggregated interest charges for the user, to achieve an optimal credit score for the user, and offer opportunities for the financial institution to select an optimal pool of candidates for promotional offers such as credit card upgrades, balance transfers, consolidation and refinancing etc.

In a variety of embodiments, the threshold amount may be set in combination of the summation of interests from the plurality of recurring payment accounts, a preferred threshold set by the user, and the threshold generated by the machine learning system. For example, an initial threshold amount may be set based on the summation of interests and the preferred amount set by the user ("I would like to reduce the interest by $32 per month"), and further tuned by the machine leaning system to generate the optimal threshold amount.

Interest visualization system 130 may receive a request for authorization for a transaction originated by a user from merchant devices 140. Merchant devices 140 may send the request for authorization for the transaction to interest visualization system 130 directly, or merchant devices 140 may send the request for authorization for the transaction to payment management system 120, which may in turn forward the request to interest visualization system 130. The request for authorization for the transaction may include transaction information such as a transaction date or timestamp, and a transaction amount associated with one of the recurring payment accounts.

Interest visualization system 130 may determine a projected interest charge associated with the transaction based on the transaction information. Interest visualization system 130 may further determine a projected aggregated daily interest charge for the transaction date associated with one or more recurring payment accounts for the user. Upon a determination that the projected aggregated daily interest charge exceeds a threshold amount, interest visualization system may generate an alert to be sent to user devices 110. The alert may indicate that if the user proceeds with the transaction, the interest charge would go beyond the threshold amount, which was set up by the user previously. The alert may recommend alternative payment methods such as using a debit card, a cash payment, a checking account, or an alternative credit card to complete the transaction. The alert may be a text message, a ticker, an email, or a voice message generated on user devices 110.

Interest visualization system 130 may be a system independent from payment management system 120. Interest visualization system 130 may also be a component residing on payment management system 120 (not shown).

Payment management systems 120, interest visualization system 130 and/or merchant devices 140 may be associated with a particular authentication session. Payment management systems 120 and interest visualization system 130 may store a variety of transaction information, receive the payment data, determine account balance and interest charges, and/or share payment data with client devices 110 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the item level data prediction system 100 in front of one or more computing devices such that any external devices may communicate directly with the specialized hardware.

Computing Devices

Figure 2:
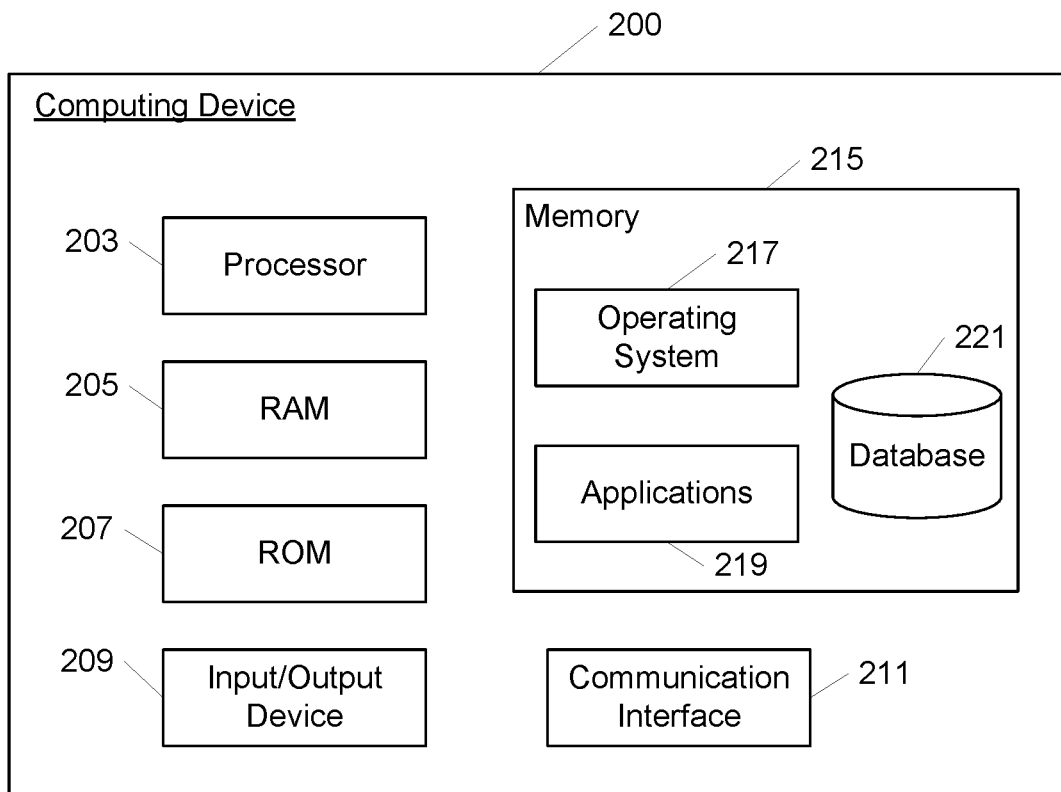
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Visualizing Interest Charges Based on Payment Options

Figure 3:
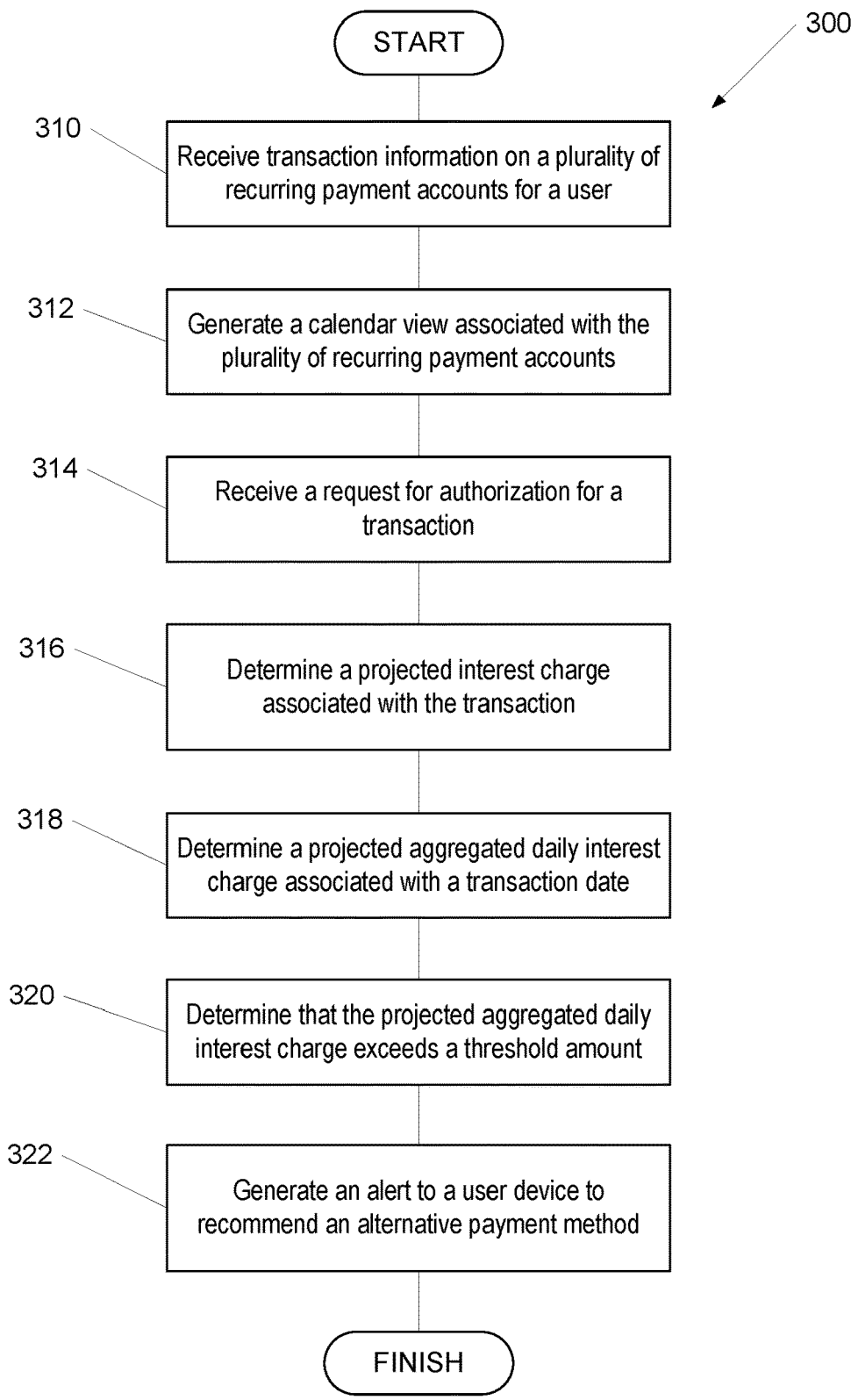
FIG. 3 shows a flow chart of a process for visualizing interest charges according to one or more aspects of the disclosure.

An interest visualization system may dynamically generate a holistic view of payment information and provide insights into the interest charges on various recurring payment accounts in real-time. FIG. 3 shows a flow chart of a process for visualizing interest charges according to one or more aspects of the disclosure. Some or all of the steps of process 300 may be performed using one or more computing devices as described herein.

At step 310, transaction information on a plurality of recurring payment accounts for a user may be received. The transaction information may include at least a balance amount, an interest rate, and a billing cycle associated with each of the plurality of recurring payment accounts. A financial institution may offer a variety of recurring payment accounts to a customer or a user such as one or more credit card accounts, mortgage accounts, car loan accounts, line of credit accounts, saving accounts and checking accounts. For a credit card account, the financial institution may, via a payment management system and present to user devices, an account statement that may include basic information such as a balance amount, an interest rate, and a billing cycle. The account statement may also indicate basic payment information such as a minimum payment, a projected payoff end date at the current interest rate if the user makes the minimal payment, a projected amount of interest charge at the payoff end date. For a mortgage account, the account statement may also include basic information such as a monthly payment, the payment schedule, the payoff end date and the interest charges. A conventional account statement may provide such basic payment information on a single account and the user may not be able to have a holistic view of the interest charges and the overall financial obligations. Given that the conventional account statement may contain limited information, a user may need to read and interpret the terms and conditions of the financial documents to understand their overall interest obligations.

At step 312, a calendar view associated with the plurality of recurring payment accounts may be generated. The calendar view may be generated based on the balance amount, the interest rate, and the billing cycle. The calendar view may display a daily balance amount and a daily interest charge associated with each date of the billing cycle for a recurring payment account that belongs to a user. For example, the calendar view may display a daily balance amount and a daily interest charge for a credit card account of the user. The calendar view may display an aggregated daily balance amount and an aggregated daily interest charge associated with each date in the billing cycle for the plurality of recurring payment accounts that belong to a user. For example, the calendar view may display an aggregated daily balance and an aggregated daily interest charge for a plurality of credit card accounts, a mortgage account and a car loan account. The calendar view may overcome the shortcomings of the conventional account statement and the users may understand the interest charges and their overall interest obligations in a visually appealing user interface on the user devices.

In a variety of embodiments, the calendar view may include information on statement fee that may be added to the account balance after a due date. In the event that there may be variable interest rates associated with a payment account, the corresponding variable interest charges may be shown on different lines displayed on the calendar view. The calendar view may display the interest charges occurred in the past, in the current billing cycle and projected in the future in a report for comparative analysis.

In a variety of embodiments, the calendar view may be generated dynamically as a response to various payment options selected by a user via the user devices in real-time. If the user selects a first projected payment amount, the calendar view may present a projected current balance and a projected daily interest charge for each day on the calendar view based on a first projected payment amount. If the user selects a second projected payment amount, the calendar view may be updated with a new projected current balance and a new daily interest charge for each day on the calendar view based on the second projected payment amount. As such, the user may have insights into the projected interest charges to compare various payment options, and make informed decisions on the financial obligations. The calendar view may be adapted to show projected interest charges as a proportion to parameters such as an available amount to spend, a budget amount, an available cash amount, or expenses etc.

The calendar view may have a zoom in/out feature. For example, the calendar view may display a plurality of recurring payment accounts, such as a credit card account with an account balance of $98,760 and a daily interest charge of $129, and an auto loan account with an account balance $18,000 with a daily interest charge of $11.90. The calendar view may provide a link to each of the recurring payment accounts for the user to select a zoom in mode to view a particular recurring payment account. In a zoom in mode, the calendar view may display the account balance and daily interest charge on the particular recurring payment account. For example, the user may select the credit card account in a zoom in mode. The calendar view may display account balance of $98,760 and a daily interest charge $129 in the zoom in mode. In a zoom out mode, the calendar view may automatically display an aggregated account balance and an aggregated daily interest charge on a plurality of recurring payment accounts that the user owns in a registered financial entity, such as a credit card account, a car loan account, a mortgage account and a line of credit account. For example, upon a selection of the zoom out mode, the calendar view may display an aggregated account balance of $116,760 and a daily interest charge of $140.90 for the credit card account and the auto loan account. The zoom out mode may allow the user to holistically view her overall interest obligations and elicit offers to consolidate debt, and to refinance debt, etc. The user may readily toggle through the zoon in and zoom out modes to view any level of interest obligations. Thus, the calendar view may provide visibility to the interest charges for each day of the billing cycle based on the user's chosen payment amount. The aggregated interest charges may be originated from across different platforms, and various types of interest bearing instruments, to provide visibility to the aggregated interest charge across an entire account summary.

At step 314, a request for authorization for a transaction may be received. The request may include a transaction date and a transaction amount for the transaction associated with a specific recurring payment account. For example, the interest visualization system may receive the request for authorization the transaction from a merchant device when a user attempts to make a purchase. The request for authorization the transaction may be received from a payment management system, where the merchant device may send the request to the payment management system and the payment management system may forward the request to the interest visualization system.

At step 316, a projected interest charge associated with the transaction may be determined. The interest visualization system may retrieve the interest rate for the specific recurring payment account that is used to conduct the transaction, and calculate the projected interest charge based on the transaction amount and the interest rate.

At step 318, a projected aggregated daily interest charge associated with the transaction date may be determined. Based on the transaction date, the interest visualization system may retrieve a previously aggregated daily interest charge for the plurality of recurring payment accounts at a timestamp prior to the time to initiate the transaction on the specific recurring payment account. The interest visualization system may determine the projected aggregated daily interest charge based on the projected interest charge for the transaction and the previously aggregated daily interest charge.

At step 320, the interest visualization system may determine that the projected aggregated daily interest charge exceeds a threshold amount. In a configuration process, a user may set up a threshold amount via the user devices. For example, the user may stipulate that the daily interest charge on an account cannot exceed $20. The user may stipulate that a threshold of $50 for interest charge on all the recurring payment accounts that belong to the user. The user may also stipulate a threshold, for example, a maximum amount of $100, for the accumulated interest charge on all the recurring payment accounts in aggregation for a billing cycle.

At step 322, an alert associated with the calendar view may be generated and sent to a user device to recommend an alternative payment method upon a determination that the projected aggregated daily interest charge exceeds the threshold amount. In a variety of embodiments, the interest visualization system may interrupt the purchase experience with an alert. The alert may be a text message, ticker, a voice message or an email. The alert may indicate that if the user chooses to complete the transaction with credit, the purchase would push the interest charge beyond the threshold amount, and ask the user whether they would want to proceed with the purchase with the current account such as a credit card. If the user selects "no," the user may be presented with an option to select a different account on file or exit the transaction to pay with cash. If the user selects "yes," the user may proceed with the current payment account.

In a variety of embodiments, for a credit card transaction that is not a digital payment, the user may get an alert with a prompt that indicates that the transaction has exceeded the threshold amount. The user may be prompted to pay the transaction from their checking account on file. If the user selects "yes," the transaction may be proceed with an auto-payment from a primary checking account.

Figure 4:
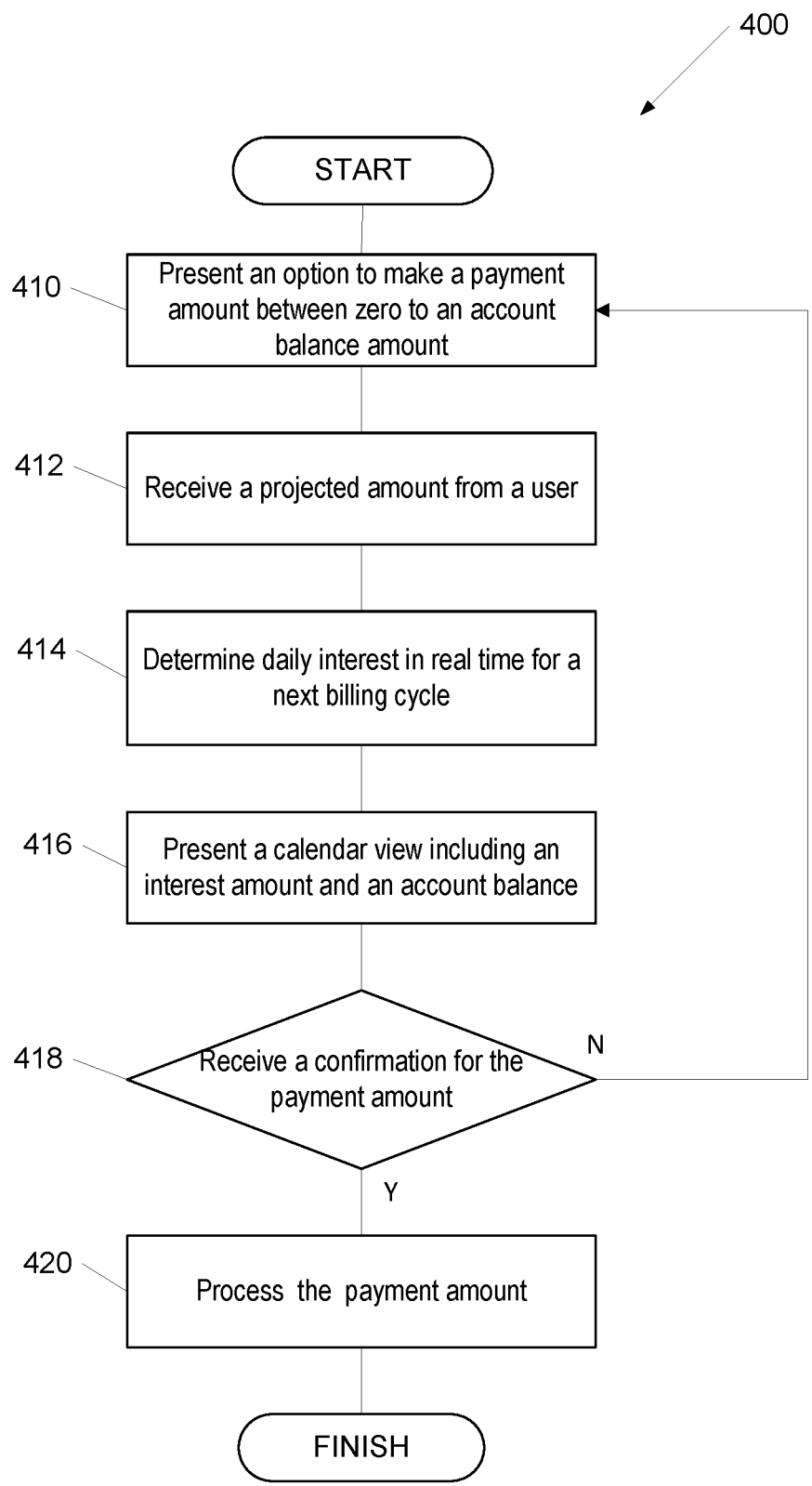
FIG. 4 shows a flow chart of a process for visualizing interest charges based on payment options according to one or more aspects of the disclosure.

FIG. 4 shows a flow chart of a process for visualizing interest charges based on payment options according to one or more aspects of the disclosure. Some or all of the steps of process 400 may be performed using one or more computing devices as described herein.

At step 410, a user may be presented with an option to make a payment amount between zero to an account balance amount. For example, a sliding bar may be presented in an interface on the user devices and the user may select the payment amount by sliding the bar to left or right to decrease or increase an amount between zero and the account balance amount that the user desires.

At step 412, a selected payment amount may be received from the user. At step 414, a daily interest charge may be determined in real-time for a next billing cycle of one or more recurring payment accounts based on the projected payment amount that the user selects. The interest visualization system may also determine the projected account balance for each day in the next billing cycle based on the projected payment amount.

At step 416, a calendar view including a projected daily interest charge and a projected account balance may be presented. The calendar view may be in either a zoom in mode or a zoom out mode. In a zoom out mode, the interest visualization system may aggregate information from multiple recurring payment accounts, and display the aggregated interest charge on the relevant accounts. The calendar view in the zoom out mode may offer more channels to make recommendations for payment. For example, the interest visualization system may recommend using a first credit card rather than a second credit card, or using a checking account rather than a credit card to make a purchase. Accordingly, the calendar view in a zoom out mode may provide a holistic view on the interest charges in aggregation, and which in turn may have increased flexibilities for the user to control and manage the user's debt obligations.

The interest visualization system may provide a real-time dynamic calendar view on how the interest may change as the user adjusts the projected payment amount moment by moment. The user may make informed decision on how to control and manage the interest charges based on the projected interest on a daily basis.

At step 418, a confirmation for the selected payment amount may be received. After reviewing the projected interest charges with various payment options, the user may determine that the selected payment amount is desirable and may send a confirmation to the interest visualization system. If a confirmation for the selected payment amount is not received, the process goes to step 410 to offer the user an option to select a different payment amount.

At step 420, the selected payment amount may be processed. This payment amount may be processed by the interest visualization system for this payment amount to be applied to the specific recurring payment account. The interest visualization system may also forward this payment amount to the payment management system to apply the payment amount to the corresponding recurring payment account.

Figure 5:
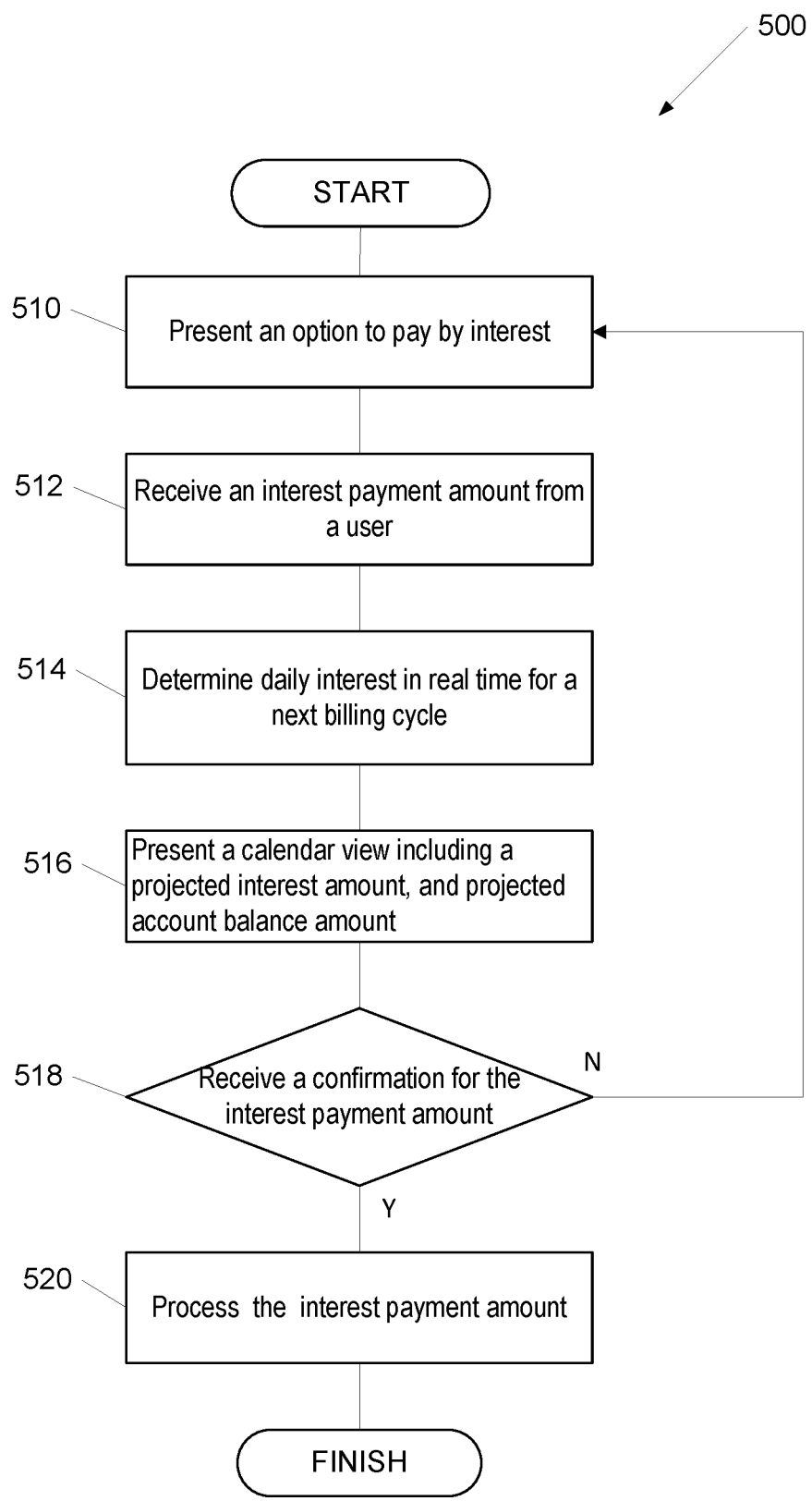
FIG. 5 shows a flow chart of a process for visualizing interest charges based on interest payment options according to one or more aspects of the disclosure.

FIG. 5 shows a flow chart of a process for visualizing interest charges based on interest payment options according to one or more aspects of the disclosure. Some or all of the steps of process 500 may be performed using one or more computing devices as described herein.

At step 510, a user may be presented with an option to make a payment by interest. The interest visualization system may present a sliding bar for the user to select a projected interest payment amount. The projected interest payment amount may be an aggregated interest charge for a billing cycle, or an aggregated interest charge on a monthly, or annually basis for a plurality of recurring payment accounts. The projected interest payment amount may be an aggregated interest charge for a lifetime of a loan or for a plurality of recurring payment accounts.

The payment by interest feature may provide opportunities for the user to identify a payment schedule targeting at minimizing interest charges in the context of the user's overall financial obligations and capacities. A user may plan to refinance a 30 year mortgage to 15 years to reduce interest charges and the term of the loan. The interest visualization system may examine the user's credit profile and determine that the user have certain amount of debt at any given monthly period. Based on the historical records, the interest visualization system may make recommendations for the options such as: 1) to make a large payment at the end of the month; 2) to make several small payments at the end of the month; or 3) to make a medium payment throughout the month. The interest visualization system may determine an optimal payment schedule to accelerate the debt payment or interest reduction, and compare the optimal payment schedule with the user's current payment schedule.

At step 512, the user may select an interest payment amount based on the recommendation from the interest visualization system. At step 514, a daily interest charge may be determined in real-time for a next billing cycle of one or more recurring payment accounts based on the projected interest payment that the user selects. The interest visualization system may also determine the projected account balance for each day in the next billing cycle based on the projected interest payment amount.

At step 516, a calendar view including a projected daily interest charge and a projected account balance may be presented. The calendar view may be in the zoom in/out modes. The interest visualization system may provide a real-time dynamic calendar view on how the interest may change as the user adjusts the projected interest payment amount so that the user may make informed decision on how to manage the interest charges and the duration of the loan.

At step 518, a determination may be made on whether a confirmation for a selected interest payment amount is received. After reviewing the projected interest charges with various interest payment amount options, the user may determine that a selected payment amount is desirable and may send a confirmation to the interest visualization system. If a confirmation for the selected payment amount is not received, the process goes to step 510, where user may be presented with an option to select a different interest payment amount.

At step 520, the selected interest payment amount may be processed. This interest payment amount may be processed by the interest visualization system directly. The interest visualization system may also forward the interest payment amount the payment management system to apply the payment amount to the corresponding recurring payment account.

Figure 6A:
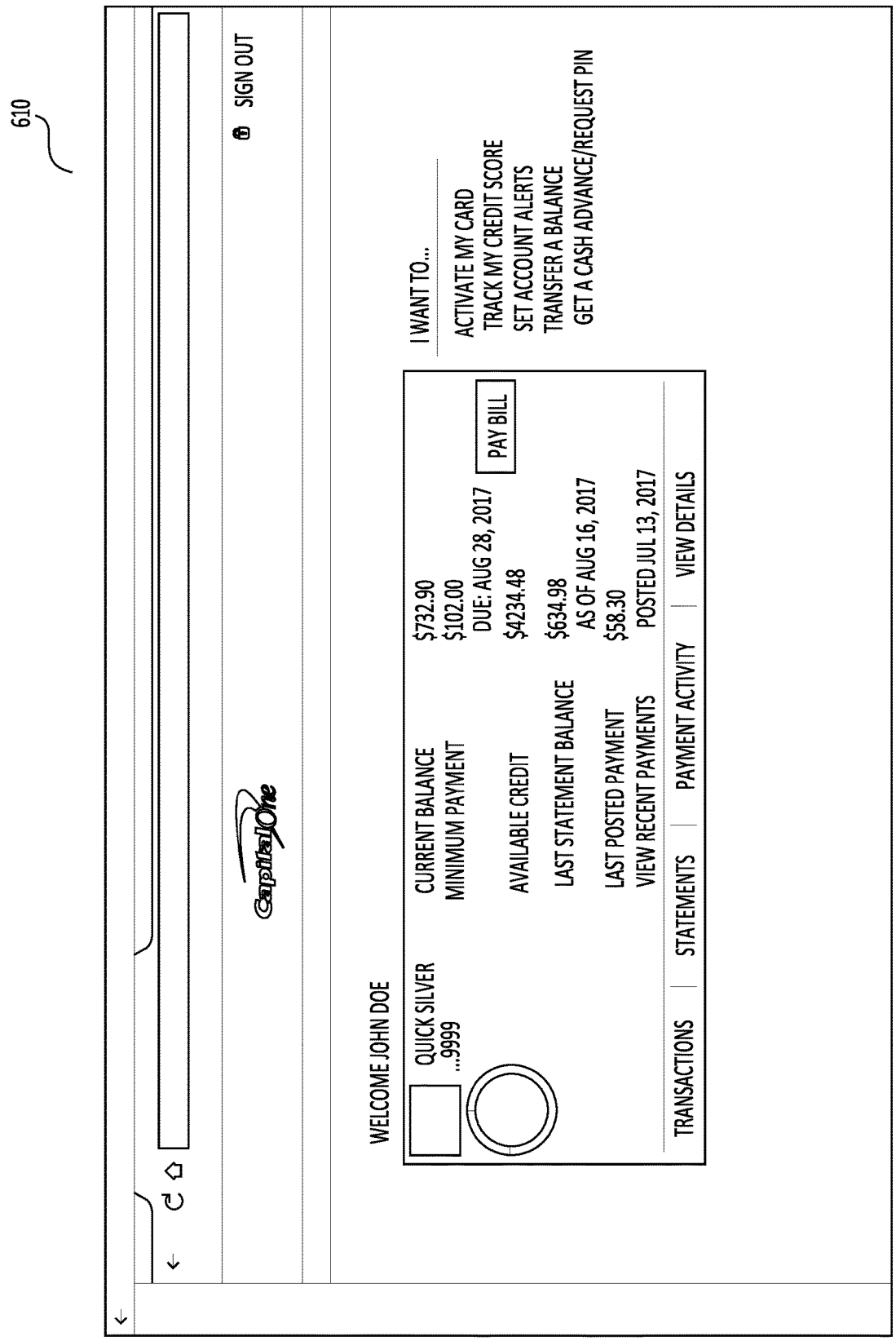
Figure 6B:
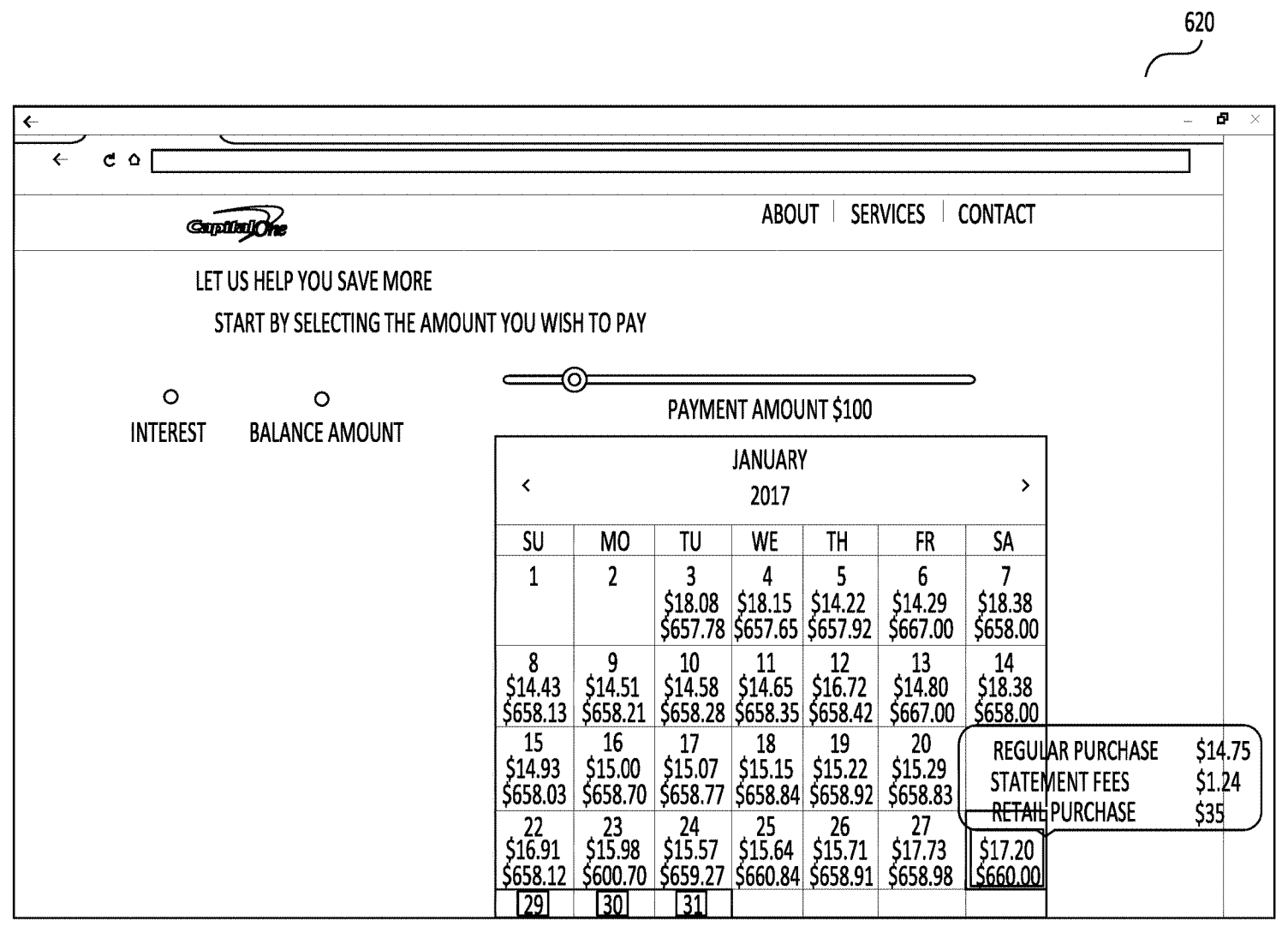

FIGS. 6A-C show various example calendar views based on payment options according to one or more aspects of the disclosure.

FIG. 6A shows an account summary for a recurring payment account. The interest visualization system may display the account summary on the user devices. The account summary on a credit card account, for example, may include a current balance of $732.90, a minimum payment of $102.00, available credit of $4234.48, last statement balance of $634.98 and a last projected payment of 58.30. The account summary may also provide a link to ZoomINT, which invokes a calendar view to highlight the savings in FIG. 6B.

FIG. 6B shows a calendar view based on a first payment amount. The user may select a payment amount of $100 that she wishes to pay by sliding the bar in the appropriate position. As illustrated in the FIG. 6B, the calendar view may dynamically generate a projected daily interest charge and a projected account balance for each day in the billing cycle. For example, the calendar view displays a projected interest of $14.08 and a projected balance of $657.78 on Jan. 3, 2017. With the projected payment amount of $100, the projected interest increases at approximately 50.07 per day in the billing cycle of January 2017. By the end of the billing cycle on Jan. 28, 2017, the projected interest is $15.99 and the projected account balance is $694.69. The calendar view may provide further insights into the projected interest of $15.99, which includes an amount $14.75 for regular purchase and an amount of $1.24 for retail purchase. The calendar view also displays a statement fee of $35 on Jan. 28, 2017.

FIG. 6C shows a calendar view based on a second payment amount. The user may select a payment amount of $344 that she wishes to pay by sliding the bar in the appropriate position. The calendar view may dynamically update the projected daily interest charge and the projected account balance for each day in the billing cycle in real-time based on this second payment amount. For example, the calendar view displays a projected balance of $408.44 and a projected interest of $8.74 on the beginning of the billing cycle of Jan. 3, 2017, with an amount of $8.74 for regular purchase, $0 for retail purchase and the statement fees of $0. With the projected payment amount of $344, the projected interest increases at approximately 50.24 per day in the billing cycle of January 2017. The projected interest is $14.97 and the projected account balance is $449.67 Jan. 28, 2017.

The user may compare the calendar views in FIGS. 6B and 6C to select a payment amount appropriate for the user's financial profile. The calendar views illustrated in FIGS. 6B and 6C may be related to a specific recurring payment account or may be an aggregated view for a plurality of recurring payment accounts that belong to the user.

In a variety of embodiments, the calendar view may offer a pay schedule that outlines the interest reduction for better management of the financial obligations. Based on a user's previous pattern of payment, the interest visualization system may make recommendations for a pay schedule. For example, the interest visualization system may indicate that if a user make an extra $5 on Wednesday, the user may pay off the debt at an accelerated rate. The interest visualization system may identify opportunities where a small amount of payment may accelerate the debt payoff end date. As many users may focus on the amount of the payment or on the minimal monthly payment, the interest visualization system may identify further opportunities in the payment schedule in addition to payment amount.

The interest visualization system may recommend a payment schedule to a user based on a variety of factors, including an interest rate, an average payment amount made by the user in the historical records, the availability of offers on the loan type, and the credit card offers such as an offer to transfer the balance with 0% APR or to buy gas with 0% APR. Based on these factors, the interest visualization system may recommend to allocate the payment to the recurring payment accounts where and when such payment may have most impact to reduce the overall financial obligations.

In a variety of embodiments, the calendar view may recommend a payment schedule using machine learning mechanism such as deep neural networks. The machine learning systems may receive inputs such as a user's account payment profile, payment types, the user's transaction pattern, the amount of credit available to the user, the APRs on user accounts, and payment cycle. The payment cycle or billing cycle may have a fixed numbers of days in each cycle and the billing cycle may be independent from a calendar month. The user's payment profile may include the frequencies and sizes of the user payment, where most users may tend to make big payment per billing cycle, while other users may make several small payments in a billing cycle. After going through several iterations of training process, the machine learning systems may generate outputs such as an optimal payment schedule for the user on one or more of the recurring payment account. The optimal payment schedule may have the potential to reduce aggregated interest charges for the user, to achieve an optimal credit score for the user and for the financial institution to select an optimal pool of candidates for credit card offers such as credit card upgrades and balance transfers.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

receiving, by an electronic payment system, transaction information that is associated with a plurality of recurring payment accounts for a user, wherein the transaction information comprises a balance amount, an interest rate, and a billing cycle associated with each of the plurality of recurring payment accounts;

generating, by the electronic payment system and based on the balance amount, on the interest rate, and on the billing cycle, a calendar view associated with the plurality of recurring payment accounts, wherein the calendar view displays an aggregated daily balance associated with each of a plurality of dates, and an aggregated daily interest charge associated with each of the plurality of dates;

receiving, by the electronic payment system, a transaction date, a transaction amount, and a request for authorization for a transaction associated with a first recurring payment account of the plurality of recurring payment accounts;

determining, based on the transaction amount, a projected interest charge associated with the transaction;

determining, based on the projected interest charge, a projected aggregated daily interest charge associated with the transaction date;

determining, using a machine learning classifier, an optimal threshold amount for the plurality of recurring payment accounts associated with the user, wherein the machine learning classifier is trained using a set of training data comprising frequencies and sizes of historical payments made by the user, wherein determining the optimal threshold amount comprises:

assigning, by the machine learning classifier, an initial threshold amount indicating a preferred threshold received from the user;

generating, based on the initial threshold amount, one or more alerts associated with a historical calendar view;

receiving, from a user device, user correction action in response to the one or more alerts; and iteratively adjusting, by the machine learning classifier and based on the user corrective action, the initial threshold amount to generate the optimal threshold amount;

detecting, by the electronic payment system, that the projected aggregated daily interest charge exceeds the optimal threshold amount; and after detecting that the projected aggregated daily interest charge exceeds the optimal threshold amount, generating, by the electronic payment system, an alert associated with the calendar view to recommend an alternative payment method to the user device.

2. The computer-implemented method of claim 1, wherein the alternative payment method comprises a cash payment, a payment via a debit card, or a checking account.

3. The computer-implemented method of claim 1, further comprising:

receiving, from the user, a first projected payment amount to be allocated to a second recurring payment account of the plurality of recurring payment accounts; and based on the first projected payment amount, dynamically generating, by the electronic payment system, a first projected calendar view and a first projected payoff end date.

4. The computer-implemented method of claim 3, further comprising:

receiving, from the user, a second projected payment amount to be allocated to the second recurring payment account of the plurality of recurring payment accounts; and based on the second projected payment amount, dynamically generating, by the electronic payment system, a second projected calendar view and a second projected payoff date.

5. The computer-implemented method of claim 1, further comprising:

detecting, by the electronic payment system and based on the transaction information, a payment pattern associated with the user corresponding to the plurality of recurring payment accounts; and determining an optimal payment schedule based on the payment pattern to minimize an aggregated interest payment amount on the plurality of recurring payment accounts.

6. The computer-implemented method of claim 5, wherein the payment pattern comprises amounts and frequencies of payments associated with the plurality of recurring payment accounts.

7. The computer-implemented method of claim 5, wherein the optimal threshold amount comprises:

a preferred amount provided by the user, an optimal amount determined using a machine learning system or a summation aggregated from the plurality of recurring payment accounts.

8. The computer-implemented method of claim 1, further comprising:

generating, by the electronic payment system and based on the transaction information of a second recurring payment account of the plurality of recurring payment accounts, a new calendar view associated with the second recurring payment account, wherein the new calendar view displays a daily balance and a daily interest charge on the second recurring payment account;

receiving a new transaction date, a new transaction amount and a new request for authorization for a new transaction associated with the second recurring payment account;

determining, based on the transaction amount, a projected interest charge associated with the new transaction;

determining, based on the projected interest charge associated with the new transaction, a projected daily interest charge associated with the new transaction date;

detecting that the projected daily interest charge exceeds a new threshold amount; and after detecting that the projected daily interest charge exceeds the new threshold amount, generating, by the electronic payment system and to the user device, a new alert associated with the calendar view to recommend a payment method using an alternative recurring payment account from the plurality of recurring payment accounts.

9. The computer-implemented method of claim 1, wherein the plurality of recurring payment accounts comprise a credit card account, a car loan account and a mortgage account.

10. The computer-implemented method of claim 1, wherein the optimal threshold amount corresponds to a daily interest charge from the plurality of recurring payment accounts associated with a calendar date in a current billing cycle or an accumulated interest charge from the plurality of recurring payment accounts since a last billing cycle.

11. The method of claim 1, wherein determining the optimal threshold amount comprises:

training, using training data comprising historical payment data associated with a plurality of users, the machine learning classifier to output recommended payment thresholds;

providing, as input to the trained machine learning classifier, payment information associated with the user; and receiving, as output from the trained machine learning classifier and based on the payment information, the optimal threshold amount.

12. An electronic payment system comprising:

one or more processors; and memory storing instructions that, when executed by the one or more processors, cause the electronic payment system to:

receive transaction information that is associated with a recurring payment account for a user, wherein the transaction information comprises a balance amount, an interest rate, and a billing cycle associated with the recurring payment account;

generate, based on the balance amount, on the interest rate, and on the billing cycle, a calendar view associated with the recurring payment account, wherein the calendar view displays a daily balance associated with each of a plurality of dates and a daily interest charge associated with each of the plurality of dates;

detect, based on the transaction information, a payment pattern associated with the user corresponding to the recurring payment account;

determine an optimal payment schedule based on the payment pattern to minimize an aggregated interest payment amount on the recurring payment account;

receive a transaction date, transaction amount, and a request for authorization for a transaction associated with the recurring payment account;

determine, based on the transaction amount, a projected interest charge associated with the transaction;

determine, based on the projected interest charge associated with the transaction, a projected daily interest charge associated with the transaction date;

determine, using a machine learning classifier, an optimal threshold amount for the recurring payment account associated with the user, wherein the machine learning classifier is trained using a set of training data comprising frequencies and sizes of historical payments made by the user, wherein determining the optimal threshold amount comprises:

assigning, by the machine learning classifier, an initial threshold amount indicating a preferred threshold received from the user;

generating, based on the initial threshold amount, one or more alerts associated with a historical calendar view;

receiving, from a user device, user correction action in response to the one or more alerts; and iteratively adjusting, by the machine learning classifier and based on the user corrective action, the initial threshold amount to generate the optimal threshold amount;

detect that the projected daily interest charge exceeds the optimal threshold amount; and after detecting that the projected daily interest charge exceeds the optimal threshold amount, generate an alert associated with the calendar view to recommend an alternative payment method and the optimal payment schedule to the user device.

13. The electronic payment system of claim 12, wherein the alternative payment method comprises a cash payment, a payment via a debit card, or a checking account.

14. The electronic payment system of claim 12, wherein the instructions cause the electronic payment system to:

receive, from the user, a first projected payment amount to be allocated to the recurring payment account; and based on the first projected payment amount, dynamically generate a first projected calendar view and a first projected payoff end date.

15. The electronic payment system of claim 14, wherein the instructions cause the electronic payment system to:

receive, from the user, a second projected payment amount to be allocated to the recurring payment account; and based on the second projected payment amount, dynamically generate a second projected calendar view and a second projected payoff date.

16. The electronic payment system of claim 12, wherein the payment pattern comprises amounts and frequencies of payments associated with the recurring payment account.

17. The electronic payment system of claim 12, wherein the instructions cause the electronic payment system to:

generate, based on the determining, a guidance to preserve or accelerate a payment schedule associated with the optimal threshold amount, wherein the guidance comprises information on promotional offers, balance transfers or refinancing opportunities.

18. The electronic payment system of claim 12, wherein the recurring payment account comprises a credit card account, a car loan account, and a mortgage account.

19. One or more non-transitory media storing instructions that, when executed by one or more processors, cause the one or more processors to perform steps comprising:

receiving transaction information that is associated with a plurality of recurring payment accounts for a user, wherein the transaction information comprises a balance amount, an interest rate, and a billing cycle associated with each of the plurality of recurring payment accounts;

generating, based on the balance amount, on the interest rate, and on the billing cycle, a calendar view associated with the plurality of recurring payment accounts, wherein the calendar view displays an aggregated daily balance associated with each of a plurality of dates and an aggregated daily interest charge associated with each of a plurality of dates;

receiving, from the user, a first projected payment amount to be allocated to a first recurring payment account of the plurality of recurring payment accounts;

based on the first projected payment amount, dynamically generating a first projected calendar view and a first projected payoff end date;

receiving, from the user, a second projected payment amount to be allocated to the first recurring payment account, of the plurality of recurring payment accounts;

based on the second projected payment amount, dynamically generating a second projected calendar view and a second projected payoff date;

receiving a transaction date, a transaction amount, and a request for authorization for a transaction associated with the plurality of recurring payment accounts;

determining, based on the transaction amount, a projected interest charge associated with the transaction;

determining, based on the projected interest charge associated with the transaction, a projected aggregated daily interest charge associated with the transaction date;

determining, using a machine learning classifier, an optimal threshold amount for the plurality of recurring payment accounts associated with the user, wherein the machine learning classifier is trained using a set of training data comprising frequencies and sizes of historical payments made by the user, wherein determining the optimal threshold amount comprises:

assigning, by the machine learning classifier, an initial threshold amount indicating a preferred threshold received from the user;

generating, based on the initial threshold amount, one or more alerts associated with a historical calendar view;

receiving, from a user device, user correction action in response to the one or more alerts; and iteratively adjusting, by the machine learning classifier and based on the user corrective action, the initial threshold amount to generate the optimal threshold amount;

detecting that the projected aggregated daily interest charge exceeds the optimal threshold amount; and after detecting that the projected aggregated daily interest charge exceeds the optimal threshold amount, generating an alert associated with the calendar view to recommend an alternative payment method to the user device.

20. The non-transitory media of claim 19, wherein the instructions cause the one or more processors to perform further steps comprising:

detecting, based on the transaction information, a payment pattern associated with the user corresponding to the plurality of recurring payment accounts; and determining an optimal payment schedule based on the payment pattern to minimize an aggregated interest payment amount on the plurality of recurring payment accounts.

21. The non-transitory media of claim 20, wherein the instructions cause the one or more processors to perform further steps comprising:
   determining the optimal payment schedule using a machine learning system.

\* \* \* \* \*